United States Patent [19]

Simon et al.

[11] Patent Number: 5,232,795
[45] Date of Patent: Aug. 3, 1993

[54] RECHARGEABLE ELECTROCHEMICAL CELL HAVING A SOLID ELECTROLYTE

[75] Inventors: Bernard Simon, Paris; Jean-Pierre Boeuve, Marcoussis, both of France

[73] Assignee: Alcatel Alsthom Compagnie Generale D Electricite, Paris, France

[21] Appl. No.: 889,234

[22] Filed: May 28, 1992

[30] Foreign Application Priority Data

May 31, 1991 [FR] France .................................. 9106589

[51] Int. Cl.$^5$ ............................................. H01M 10/40
[52] U.S. Cl. ...................................... 429/192; 429/218
[58] Field of Search ................. 429/192, 218, 33, 190; 252/62.2

[56] References Cited

U.S. PATENT DOCUMENTS

| | | | |
|---|---|---|---|
| 4,303,748 | 12/1981 | Armand et al. | 429/192 |
| 4,792,504 | 12/1988 | Schwab et al. | 429/192 |
| 4,830,939 | 5/1989 | Lee et al. | 429/192 |
| 5,028,500 | 7/1991 | Fong et al. | 429/218 X |
| 5,069,683 | 12/1991 | Fong et al. | 429/218 X |

FOREIGN PATENT DOCUMENTS 9013924 11/1990 Canada .
0404578 12/1990 European Pat. Off. .

*Primary Examiner*—Anthony Skapars
*Attorney, Agent, or Firm*—Sughrue, Mion, Zinn Macpeak & Seas

[57] ABSTRACT

A rechargeable electrochemical cell comprising a cathode, an anode based on a carbon-containing material capable of intercalating lithium ions, and an electrolyte constituted by a cross-linked polymer incorporating a lithium salt and a dipolar aprotic solvent. At least the surface of the carbon-containing material is less crystallized than graphite so as to be impermeable to said solvent, while allowing the lithium to diffuse.

8 Claims, No Drawings

RECHARGEABLE ELECTROCHEMICAL CELL HAVING A SOLID ELECTROLYTE

The present invention relates to a rechargeable electrochemical cell having a solid electrolyte, and having a negative active material based on lithium.

Developing such an "all-solid" high potential rechargeable cell is of considerable interest given the major advantages it can offer: flexibility, no risk of leakage, and no separator.

To make the electrolyte for such a cell, it is possible to use ion-conducting polymers which can only be used at temperatures higher than ambient temperature. For example, U.S. Pat. No. 4,303,748 describes plasticized polyethylene oxide (PEO) incorporating a metal salt, but requiring an operating temperature of 80° C. U.S. Pat. No. 4,830,939 describes a cell containing an electrolyte of that type.

In order to lower the operating temperature to ambient temperature, U.S. Pat. No. 4,792,504 describes using cross-linked polymers containing an ion-conducting phase comprising a metal salt and a dipolar aprotic solvent. U.S. Pat. No. 2,653,938 describes a lithium anode cell using such a polymer. However, during cycling, the lithium electrode undergoes changes in its shape due to the growth of dendrites which have detrimental effects such as the risk of short-circuits, and diminished cycling efficiency.

In order to avoid those drawbacks, consideration has been given to replacing the metallic lithium anode by an anode made of graphite with the lithium being intercalated therein (see article R. Yazami, Ph. Touzain, J. Power, Sources 9, 1983, p. 365). However, it has been observed that associating natural or artificial graphite with the above-mentioned ion-conducting polymers containing solvents leads to a drop in capacity during operation, and to considerable swelling of the anode, and this may give rise to exfoliation of the graphite.

An aim of the present invention is to provide a rechargeable electrochemical cell of the preceding type, but in which the carbon-based anode retains its qualities during cycling.

The present invention provides a rechargeable electrochemical cell comprising a cathode, an anode based on a carbon-containing material capable of intercalating lithium ions, and an electrolyte constituted by a cross-linked polymer which is preferably a conductor of ions and which incorporates a lithium salt and a dipolar aprotic solvent, said cell being characterized by the fact that said anode is constituted by a mixture of said electrolyte and said carbon-containing material, with at least the surface of the carbon-containing material being less crystallized than graphite so as to be impermeable to said solvent, while allowing the lithium to diffuse.

In a first embodiment, said carbon-containing material is chosen from cokes, graphitized carbon fibers, and pyrolytic carbons. Such carbons have small crystallites, and a certain number of structural faults, such as interstitial carbon atoms between the planes, or mutually disorientated planes.

The anode of the cell of the invention prevents solvent co-intercalation which is responsible for swelling during cycling. However, it should be noted that structural imperfections limit the intercalation kinetics of lithium, and therefore it may be advantageous to use a material based on highly crystallized graphite having its surface covered with a thin layer of incompletely graphitized carbon.

Such a layer may be obtained by carbonizing a film of polymer, such as polyacrylonitrile, or by chemical vapor deposition (CVD) using a hydrocarbon, e.g. methane or benzene.

The electrolyte polymer is preferably a cross-linked ion-conducting polymer of the type described in U.S. Pat. No. 2,653,938.

Such a polymer incorporates a conductive salt whose cation is lithium and whose anion is preferably chosen from $AsF_6^-$, $BF_4^-$, $PF_6^-$, $CF_3SO_3^-$, $ClO_4^-$, $B(C_6H_5)_4^-$, $N(CF_3SO_2)_2^-$, and $SCN^-$.

The non-aqueous solvent is preferably chosen from ethylene carbonate, propylene carbonate, tetrahydrofuran, dimethylcarbonate, diethylcarbonate, methyl formate, dimethylsulfite, deimethylsulfoxide, 1-2 dimethoxyethane, sulfolane, g-butyrolactone, polyethylene glycol dimethylether, and mixtures thereof.

The cathode is a composite electrode constituted by a material having a high redox potential (e.g. such as $LiV_2O_5$, $LiCoO_2$, polyaniline and polypyrrol, in the reduced state and doped with lithium ions), said electrolyte, and optionally a conductive powder (e.g. such as carbon black or graphite).

Other characteristics and advantages of the present invention will appear on reading the following description of an embodiment given by way of non-limiting example.

An electrolyte, an anode, and a cathode were prepared as follows:

The solid polymer electrolyte was made by mixing 0.5 g of polyoxyethylene (20,000)bis(amine), 0.1 g of $LiAsF_6$, 15 μl of ethylene glycol diglycidyl ether as a setting agent, and 0.7 g of propylene carbonate as a plasticizer.

Cross-linking took place at 70° C. for 16 hours.

The anode was obtained in the same way, with 2 g of the carbon powder sold under the name M-2007S (Kureha) being added to the mixture.

The cathode was obtained in the same way, with 1.5 g of $LiCoO_2$ (sold by Aldrich) and 0.03 g of carbon black being added to the mixture. Prior to cross-linking, the mixture was deposited on a titanium collector to form a layer of desired width (about 1 mm).

A button cell was made by stacking the three preceding components (anode-electrolyte-cathode) in the form of wafers having a diameter of 15 mm, and thicknesses of 1 mm for the anode, 0.05 mm for the electrolyte and 1 mm for the cathode.

The cell was charged to 4.2 V at a current density of 0.25 $mA/cm^2$.

The cycled capacity between 3 V and 4.2 V was 150 mAh/g of carbon in the anode, and remained stable for more than 500 cycles.

Naturally, the invention is not limited to the above-described embodiment. Any means may be replaced by equivalent means without going beyond the ambit of the invention.

We claim:

1. In a rechargeable electrochemical cell comprising a cathode, an anode based on a carbon-containing material capable of intercalating lithium ions, and an electrolyte constituted by a cross-linked polymer incorporating a lithium salt and a dipolar aprotic solvent, the improvement wherein said anode is constituted by a mixture of said electrolyte and said carbon-containing material, with at least the surface of the carbon-containing material being less crystallized than graphite so as to be impermeable to said solvent, while allowing the lithium to diffuse therein.

2. A electrochemical cell according to claim 1, wherein said carbon-containing material is selected from the group consisting of cokes, graphitized carbon fibers, and pyrolytic carbons.

3. An electrochemical cell according to claim 1, wherein the surface of said carbon-containing material includes a CVD hydrocarbon deposit.

4. An electrochemical cell according to claim 1, wherein the surface of said carbon-containing material includes a carbonized polymer film deposit such as polyacrylonitrile.

5. An electrochemical cell according to claim 1, wherein said electrolyte is a cross-linked conductive polymer incorporating a metal salt having an anion selected from the group consisting of $AsF_6^-$, $BF_4^-$, $PF_6^-$, $CF_3SO_3^-$, $ClO_4^-$, $B(C_6H_5)_4^-$, $N(CF_3SO_2)_2^-$, and $SCN^-$, and a non-aqueous solvent selected from the group consisting of ethylene carbonate, propylene carbonate, tetrahydrofuran, dimethylcarbonate, diethylcarbonate, methyl formate, dimethylsulfite, deimethylsulfoxide, 1-2 dimethoxyethane, sulfolane, g-butyrolactone, polyethylene glycol dimethylether, and mixtures thereof.

6. An electrochemical cell according to claim 5, wherein said cross-linked conductive polymer is a polyether selected from the group consisting of polyethylene oxide and polypropylene oxide, and copolymers thereof.

7. An electrochemical cell according to claim 1, wherein said cathode is a composite electrode constituted by a material having a high redox potential, said electrolyte and a conductive powder selected from the group consisting of carbon black and graphite.

8. An electrochemical cell according to claim 7, wherein said material having a high redox potential is one material selected from the group consisting of $LiV_2O_5$, $LiCoO_2$, polyaniline and polypyrrol, in the reduced state and doped with lithium ions.

* * * * *